United States Patent

[11] 3,575,618

[72] Inventor Frederick Y. Kawabata
Beaverton, Oreg.
[21] Appl. No. 747,371
[22] Filed July 24, 1968
[45] Patented Apr. 20, 1971
[73] Assignee Tektronix, Inc.
Beaverton, Oreg.

[54] APPARATUS FOR PROVIDING AN ACCURATELY DELAYED OUTPUT PULSE OF ACCURATELY PREDETERMINED DURATION
20 Claims, 3 Drawing Figs.

[52] U.S. Cl. .......... 307/293, 307/228, 307/265, 307/286, 307/322, 328/55, 328/58
[51] Int. Cl. .......... H03k 17/28
[50] Field of Search .......... 307/265, 293, 246, 228, 260, 286, 322; 328/55, 58, 59

[56] References Cited

UNITED STATES PATENTS 3,007,055 10/1961 Herzfeld .......... 307/263X
3,007,060 10/1961 Guenther .......... 307/293X
3,317,743 5/1967 Rogers .......... 307/246X
3,358,159 12/1967 Smith .......... 307/228
3,365,587 1/1968 Baur .......... 307/265X

*Primary Examiner*—Stanley D. Miller, Jr.
*Attorney*—Buckhorn, Blore, Klarguist and Sparkman

ABSTRACT: An input signal operates a tunnel diode and switches a pair of transistors from a conducting state to a cutoff condition. Each such transistor is provided a capacitor timing circuit coupled to its emitter electrode for restoring conduction in the transistor after a predetermined time, such time period being different for each transistor. The output of each transistor is coupled to an output circuit including a tunnel diode, and when the first of said transistors returns to conduction, the output tunnel diode is triggered. When the second of the transistors returns to a conducting condition, the output circuit is inhibited whereby the tunnel diode output is concluded.

FREDERICK Y. KAWABATA
*INVENTOR*
*BY*
*BUCKHORN, BLORE, KLARQUIST & SPARKMAN*
*ATTORNEYS*

APPARATUS FOR PROVIDING AN ACCURATELY DELAYED OUTPUT PULSE OF ACCURATELY PREDETERMINED DURATION

BACKGROUND OF THE INVENTION

A triggerable device, such as an oscilloscope, almost always requires a trigger in advance of a high-speed signal so that a display may be produced with minimum time jitter. In a typical prior art triggering circuit (illustrated at FIG. 1 herein), a trigger output is produced, and the same trigger output is delayed by a delay line before application to a pulse generator which produces the output to be viewed on an oscilloscope. Unfortunately, use of a delay line is not always practical because of the space occupied thereby, its cost, and because of the degradation of the delayed trigger rise time.

SUMMARY OF THE INVENTION

According to the present invention, an accurately delayed output pulse of accurately predetermined duration is produced without the use of a delay line. Moreover, the circuit is interconnected such that differences in supply levels are balanced out and do not affect the delay produced. In the circuit of the present invention, a pair of current control means are connected to a common output circuit, wherein such output circuit preferably includes a tunnel diode. An input means, also preferably including a tunnel diode, is coupled for simultaneously changing the conducting condition of the pair of current control means. A first timing circuit associated with a first of the current control means allows such first current control means to return to its initial condition after a first accurately predetermined time. Such a restoration of the initial condition for the first current control means actuates the output means after such predetermined period for initiating an output pulse. Subsequently, a second timing circuit associated with the second of the current control means causes the second current control means to inhibit production of the output pulse. This also takes place after an accurately predetermined time period. As a result, an output pulse is produced after an accurately determined delay, and such pulse is of accurately predetermined duration. Both of the timing circuits, as well as the input means for simultaneously changing the conducting condition of the current control means, and the input signal, are referred to common voltage levels, whereby a change in supply voltage has substantially no effect upon the output pulse delay or the duration of the pulse.

It is accordingly an object of the present invention to provide an improved delayed pulse generator for producing an accurately delayed pulse without employing a conventional delay line.

It is a further object of the present invention to provide an improved delayed pulse generator for supplying a delayed output pulse, the delay and duration of which are accurately predetermined.

It is a further object of the present invention to provide an improved electronic delay circuit for producing an output of accurately predetermined delay and duration, which circuit is substantially unaffected by changes in supply voltages.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
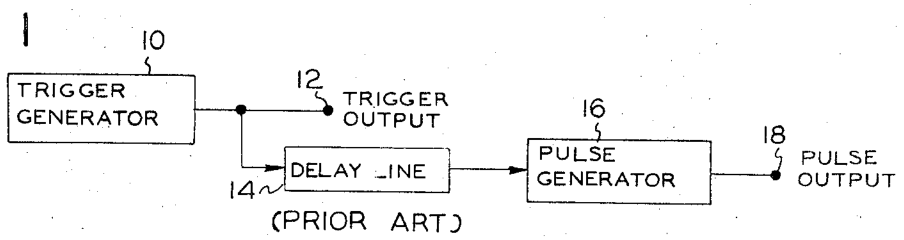
FIG. 1 is a block diagram illustrating the use of a delay means between a trigger generator and a pulse generator, the delay means here comprising a prior art delay line.

In FIG. 1, a trigger generator 10 produces a trigger output at 12 which may be employed to operate an oscilloscope or the like. The output of trigger generator 10 is also applied through a delay line 14 to a pulse generator 16 for providing a pulse output at 18. Since the trigger generator output is applied to the pulse generator 16 with a delay, the pulse output at 18 will be delayed with respect to the trigger output at 12. The pulse generator may, for example, produce a pulse which is to be examined on an oscilloscope, in which case the prior occurring trigger output at 12 may be applied to the triggering circuitry in the oscilloscope whereby a sweep in the oscilloscope will be started prior to the occurrence of the pulse output at 18, in order that the pulse can be viewed along the sweep. As hereinbefore stated, delay lines are expensive and space-consuming, and moreover do not produce an accurate representation of the input presented thereto. In accordance with the present invention, delay line 14 is replaced by a delayed pulse generator illustrated in FIG. 2.

Figure 2:
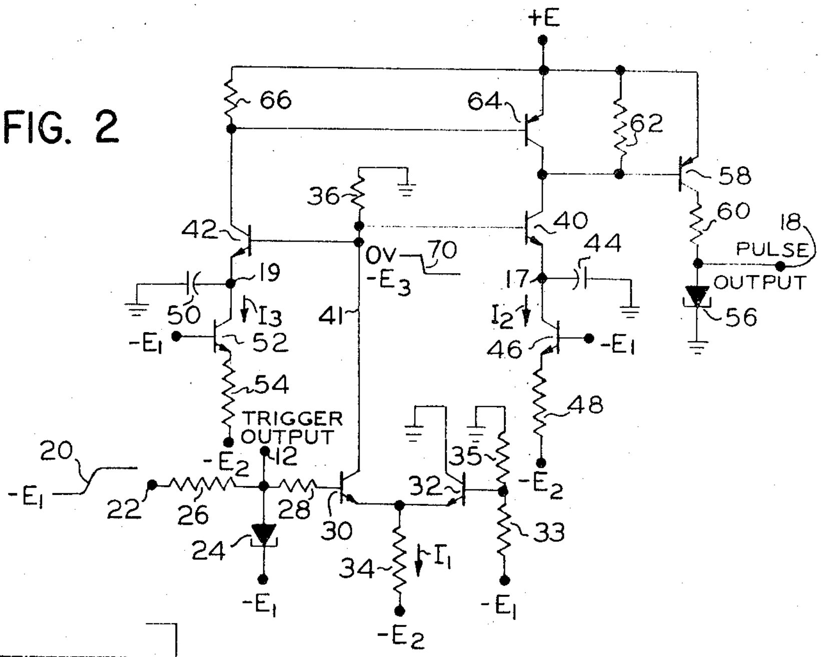
FIG. 2 is a schematic diagram of a circuit according to the present invention.

Referring to FIG. 2, the delayed pulse generator receives an input step 20 which starts at a voltage level $-E_1$ and rises to a somewhat higher level in a predetermined short period of time. This input step signal is applied at terminal 22 which is coupled to the anode of tunnel diode 24 by means of resistor 26, the cathode of tunnel diode 24 being returned to the voltage level $-E_1$, or the same voltage level to which the input signal was referred. Resistors 26 and 28 reduce the loading on tunnel diode 24. The trigger output 12, resulting from the tunnel diode being triggered to its high voltage state, may be used in operating the trigger circuitry in an oscilloscope, and is taken from the anode of the tunnel diode. The anode of the tunnel diode is also coupled through a resistor 28 to the base electrode of a transistor 30, the latter forming a part of a current switching means in conjunction with transistor 32. The emitters of the two transistors are connected together and returned to a voltage $-E_2$ through resistor 34. The base of transistor 32 is connected to the midpoint of a voltage divider comprising resistors 33 and 35 disposed between voltage $-E_1$ and ground. The collector of transistor 32 is grounded, while the collector of transistor 30 is returned to ground through resistor 36, as well as being connected to the base electrodes of transistors 40 and 42. The latter transistors comprise first and second current control circuits means according to the present invention.

Transistor 40 is provided with a timing circuit including a capacitor 44 disposed between the emitter of transistor 40 and ground. A supply circuit for transistor 40 and capacitor 44 comprises a transistor 46 having its collector electrode connected to the emitter electrode of transistor 40, and having its emitter electrode coupled to the voltage $-E_2$ through resistor 48. The base of transistor 46 is connected to $-E_1$.

A timing circuit for transistor 42 includes a capacitor 50 disposed between the emitter electrode of transistor 42 and ground. A supply circuit for transistor 42 and capacitor 50 comprises a transistor 52 having its collector connected to the emitter of transistor 42 and having its emitter returned to the voltage $-E_2$ through resistor 54.

An output circuit for the generator according to the present invention includes a triggerable means, preferably comprising a tunnel diode 56, having its cathode grounded and its anode connected to pulse output terminal 18. An output transistor 58 for operating the tunnel diode has its emitter connected to a supply voltage $+E$ and its collector connected to the anode of tunnel diode 56 through resistor 60. The base of transistor 58 is returned to $+E$ through resistor 62. The base of transistor 58 is also connected to the collector electrode of transistor 40.

The output circuit further includes a second transistor 64 having its emitter connected to $+E$, its collector connected to the collector of transistor 40, and having its base electrode connected to the collector of transistor 42. The base electrode of transistor 64 is also returned to $+E$ through resistor 66.

As thus appears, the output circuit provides coupling for the collectors of transistors 40 and 42 to supply voltage $+E$. The output circuit is also biased such that when both transistors 40 and 42 are conducting, the current from the collector of transistor 42 provides enough base current to saturate transistor 64, which in turn holds transistor 58 in an off condition, inasmuch as the base of transistor 58 is then held at approximately $+E$. When transistor 40 conducts and transistor 42 does not, the collector current of transistor 40 turns transistor 58 on, causing current to flow through resistor 60 and tunnel diode 56. However, transistors 40 and 42 are normally both conducting, in the absence of an input signal step, and transistor 64 normally inhibits operation of transistor 58.

All of the transistors employed in the illustrated embodiment of the circuit according to the present invention, are NPN transistors except transistors 58 and 64 which are PNP. It is apparent that PNP transistors may be substituted for any or all of the illustrated NPN transistors, and vice versa, with appropriate changes being made in the circuitry in order to operate such transistors.

In operation of the circuit according to the present invention, transistor 32 is biased by the voltage divider comprising resistors 33 and 35 such that transistor 32 normally conducts all of the current $I_1$. This assumes tunnel diode 24 is in its low voltage state. However, when tunnel diode 28 is switched to its high voltage state by an input signal step 20, the base of transistor 30 is rapidly raised to the level such that transistor 30 will conduct all of the current $I_1$. The voltage charge across tunnel diode 24 is seen at 68 in FIG. 3, and may be employed as a trigger output as hereinbefore discussed.

During quiescent conditions, the voltage at terminal 22 is $-E_1$, keeping tunnel diode 24 in its low voltage state. Therefore, transistor 30 is normally nonconducting, and the voltage on line 41, connected to the collector of transistor 30, is at or near zero volts or ground level, there being very little voltage drop in resistor 36 at this time. Both the transistors 40 and 42 are conducting, and carry currents $I_2$ and $I_3$, respectively, in their collector-emitter circuits. Current from the collector of transistor 42 provides enough base current to saturate transistor 64, which, in turn, holds off transistor 58 as hereinbefore described. The current $I_2$ flowing through transistor 40 also flows through the collector-emitter path of transistor 46 and resistor 48 to $-E_2$. Similarly, the current $I_3$ in transistor 42 flows through the collector-emitter path of transistor 52 and resistor 54 to $-E_2$.

When positive-going step 20 is applied at 22, current through tunnel diode 24 exceeds the diode peak current, and the diode switches quickly to its high voltage state. This fast voltage step, illustrated at 68 in FIG. 3, turns on transistor 30, and with transistor 30 conducting, the voltage at 41 drops to a $-E_3$ volts, turning off both transistors 40 and 42. The latter drop is illustrated at 70 in FIGS. 2 and 3. Capacitor 44 starts charging negatively with the now available current $I_2$. Similarly, capacitor 50 starts charging with the current $I_3$. The charging of capacitors 44 and 50 are depicted at 72 and 74, respectively, in FIG. 3. The $I/C$ ratio of current $I_2$ and the capacitance of capacitor 44 is larger than the ratio of $I_3$ and the capacitance of capacitor 50. Thus, capacitor 44 charges faster, and the slope of the voltage ramp at point 17 is greater than the slope of the voltage ramp at point 19. Stated another way, the RC time constant of capacitor 44 together with the resistance of resistor 48 and that of transistor 46 in this circuit is less than the RC time constant of capacitor 50 and the resistance of resistor 54 and transistor 52. Capacitor 44 continues to charge until the voltage at the emitter of transistor 40 is sufficiently negative so that transistor 40 turns back on. At this time, transistor 42 is still off. Therefore, the output circuit is not inhibited, and transistor 40 supplies base current for turning on transistor 58, in turn causing current to flow through resistor 60 and tunnel diode 56. This current quickly drives tunnel diode 56 to its high voltage state for producing the initial rise or start of pulse output 76, as viewed in FIG. 3, at an accurately predetermined time. The amount of time that this output pulse is delayed with respect to step 68 is determined primarily by the amplitude of the voltage swing at 41, and the slope of the voltage ramp 72 at 18.

Figure 3:
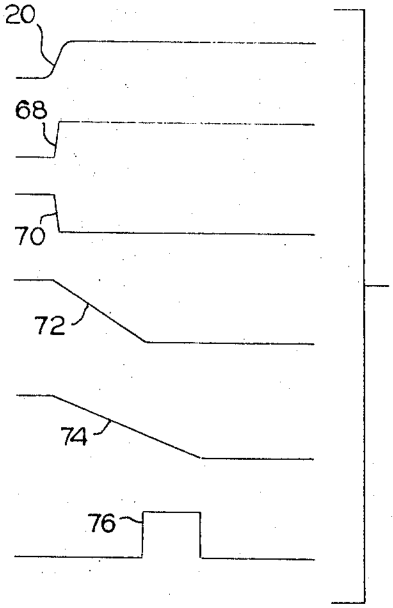
FIG. 3 is a chart of waveforms illustrating operation of the FIG. 2 circuit.

Subsequently, when the voltage ramp at point 19, depicted at 74 in FIG. 3, is sufficiently negative, transistor 42 is also turned on. The now conducting transistor 42 turns transistor 64 on for inhibiting operation of transistor 58. Therefore, the output pulse 76 is rapidly concluded. The output pulse width is accurately predetermined and equal to the difference in delay times generated by ramps 72 and 74 at points 17 and 19.

The length of the delay can, of course, be altered by choice of capacitor 44 and resistance of resistor 48. Similarly, the length of pulse can be selected through choice of the elements 50 and 54.

After the above-described operation, the circuit is in a state similar to the original quiescent state, but with capacitors 44 and 50 negatively charged. To reset the circuit, the voltage at terminal 22 is reduced until tunnel diode 24 returns to its low voltage state.

It is noted that the current switching means comprising resistors 30 and 32 is returned to the same voltage, $-E_2$, as the current supply circuit for capacitor 44 comprising transistor 46 and resistor 48, as well as the current supply circuit for capacitor 50 comprising transistor 52 and resistor 54. Thus, if this supply voltage changes, the currents will change somewhat, but the times required for charging capacitors 44 and 50 remain substantially the same. Also, the base of transistor 32 as well as the bases of transistors 46 and 52 are referenced to the same voltage level, $-E_1$, to which the input signal step is referenced. The circuit will similarly be relatively unaffected by a change in this voltage. The change in either $-E_1$ or $-E_2$ causes currents $I_1$, $I_2$, and $I_3$ to change by equal percentages. A change in $I_1$ causes an equal percentage change in the magnitude of $-E_3$. However, the delay interval and pulse width are not affected because the change in $-E_3$ is precisely compensated by the change in $I_2$ and $I_3$. The delay times are also essentially unaffected by variations in the positive supply $+E$. The rapid current rise-rate through output tunnel diode 56 minimizes the effect of variations, such as ripple, in supply voltage $+E$.

Although the delay pulse generator according to the present invention is particularly described with reference to the operation of an oscilloscope, it is understood this application is given mainly by way of example, and other uses of the circuit for accurately delaying the production of a pulse will occur to those skilled in the art.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A delayed pulse generator comprising:

input means for receiving an input signal level, output triggerable means, and first and second circuit means responsive to said input means when an input signal level is reached, the first circuit means being responsive to the input means when an input signal level is reached to initiate a first operating period, the second circuit means being responsive to the input means when the same input level is reached to initiate a second operating period, the second operating period associated with the second circuit means being longer than the first operating period associated with the first circuit means, and means coupling said first circuit means for bringing about triggering of said output triggerable means at the end of said first operating period after said input signal level is reached, and means coupling said second circuit means for concluding the output of said triggerable means at the end of said second operating period after said input signal level is reached.

2. The delayed pulse generator according to claim 1 wherein said means coupling said second circuit means for concluding the output of the triggerable means comprises means for inhibiting current supply to said triggerable means at the end of said second operating period.

3. The delayed pulse generator according to claim 1 wherein said triggerable means comprises an output tunnel diode.

4. The delayed pulse generator according to claim 1 wherein said first and second circuit means each comprise transistors, each turned off at its base in response to an input signal level, and each having a capacitor charging circuit at its emitter for restoring conduction in each such transistor after a respective operating period for providing the said operating periods.

5. A delayed pulse generator comprising:

first and second current control means, output means for receiving the outputs of said first and second current control means in the normal condition thereof, for producing in response thereto a first level of output, means for simultaneously changing the conducting condition of said first and second current control means, a first timing circuit associated with the first current control means for causing said first current control means to return to its normal condition after a first predetermined time period for causing said output means to produce a second level of output, and a second timing circuit associated with said second current control means for causing said second current control means to return to its normal condition after a second and longer predetermined time period causing said output means to return to its first level of output.

6. The delayed pulse generator according to claim 5 wherein said means for simultaneously changing the conducting condition of said first and second control means, and said first and second timing circuits, are referred to the same source of supply.

7. The delayed pulse generator according to claim 5 wherein said second control means is effective to inhibit said output means so that said first current control means causes the output means to produce the second level of output only before the second current control is returned to its normal condition.

8. The delayed pulse generator according to claim 5 wherein said means for simultaneously changing the conducting condition of said first and second current control means includes a tunnel diode for providing an initial trigger output in response to an input signal.

9. The delayed pulse generator according to claim 5 wherein said output means includes a tunnel diode triggered from a first voltage state to a second voltage state when said first current control means returns to its normal condition, and from a second voltage state to a first voltage state when the second current control means also returns to its normal condition.

10. The delayed pulse generator according to claim 5 wherein each said current control means comprises a transistor including a base electrode, a collector electrode, and an emitter electrode, such transistor receiving a control input on a base electrode and providing an output for coupling to said output means at the collector electrode thereof, the timing circuit associated therewith comprising a capacitor coupled to the transistor's emitter electrode and a source of supply for said capacitor.

11. The delayed pulse generator according to claim 10 wherein said means for simultaneously changing the conducting condition of said first and second current control means comprises current switching means referred to the same source of supply as each such capacitor.

12. The delayed pulse generator according to claim 10 wherein said capacitor is connected to said emitter electrode, and further including a resistor and another transistor having its emitter-collector path in series with said resistor between said emitter electrode and a source of supply.

13. The delayed pulse generator according to claim 5 wherein said output means includes a first transistor adapted to be operated by said first current control means, and a second transistor for inhibiting operation of said first transistor in response to an output from said second current control means.

14. A circuit for producing a voltage change delayed by a predetermined period comprising:

a transistor including a base electrode, an emitter electrode, and a collector electrode, first means connected to the base electrode of said transistor and responsive to an input signal for changing the voltage at the base of said transistor relative to the voltage at the emitter electrode of said transistor from a first level to a second level for cutting off said transistor, a capacitor and a charging supply circuit therefor coupled to said emitter electrode of said transistor for causing the voltage level of said emitter electrode to change from a first level to a second level after a predetermined time period for restoring conduction in said transistor, and a tunnel diode coupled to the collector electrode of said transistor for switching from a first voltage state to a second voltage state in response to restoration of conduction in said transistor.

15. The circuit according to claim 14 further including an input tunnel diode responsive to an input signal for operating said means connected to the base electrode of said transistor.

16. The circuit according to claim 14 wherein said means connected to the base electrode of said transistor is returned to the same supply voltage levels as said charging supply circuit for said capacitor.

17. The circuit according to claim 14 wherein said means connected to the base electrode of said transistor comprises a current switching circuit including a pair of transistors wherein the base electrode of one transistor of said pair is coupled to a first voltage supply level:

means coupling the emitter electrodes of said pair of transistors to a second voltage supply level, means coupling the collector electrode of the other of said pair of transistors to the base electrode of the first mentioned transistor, and the charging supply circuit for said capacitor including a fourth transistor having its collector-emitter path coupled between the emitter electrode of the first mentioned transistor and said second voltage supply level, the base electrode of the fourth transistor being coupled to said first voltage supply level.

18. The circuit according to claim 17 further including an input tunnel diode responsive to an input signal for operating the means connected to the base electrodes of said transistors, and wherein said input signal is referenced to said first voltage supply level.

19. The circuit according to claim 14 further including a second transistor having a base electrode, an emitter electrode, and a collector electrode, said base electrode of said second transistor being connected for having its voltage level changed by said first means:

a capacitor and a charging supply circuit therefor coupled to the emitter electrode of the second transistor for causing the voltage level of said emitter electrode of said second transistor to change from a first level to a second level after a second and longer predetermined time period for restoring conduction in said second transistor, and said tunnel diode being coupled to the collector electrode of the second transistor and responsive to restoration of conduction therein for switching back to a first voltage state.

20. The circuit according to claim 19 wherein said means connected to the base electrodes of said transistors is returned to the same supply voltage levels as said charging supply circuits for said capacitors.